Figure 1:
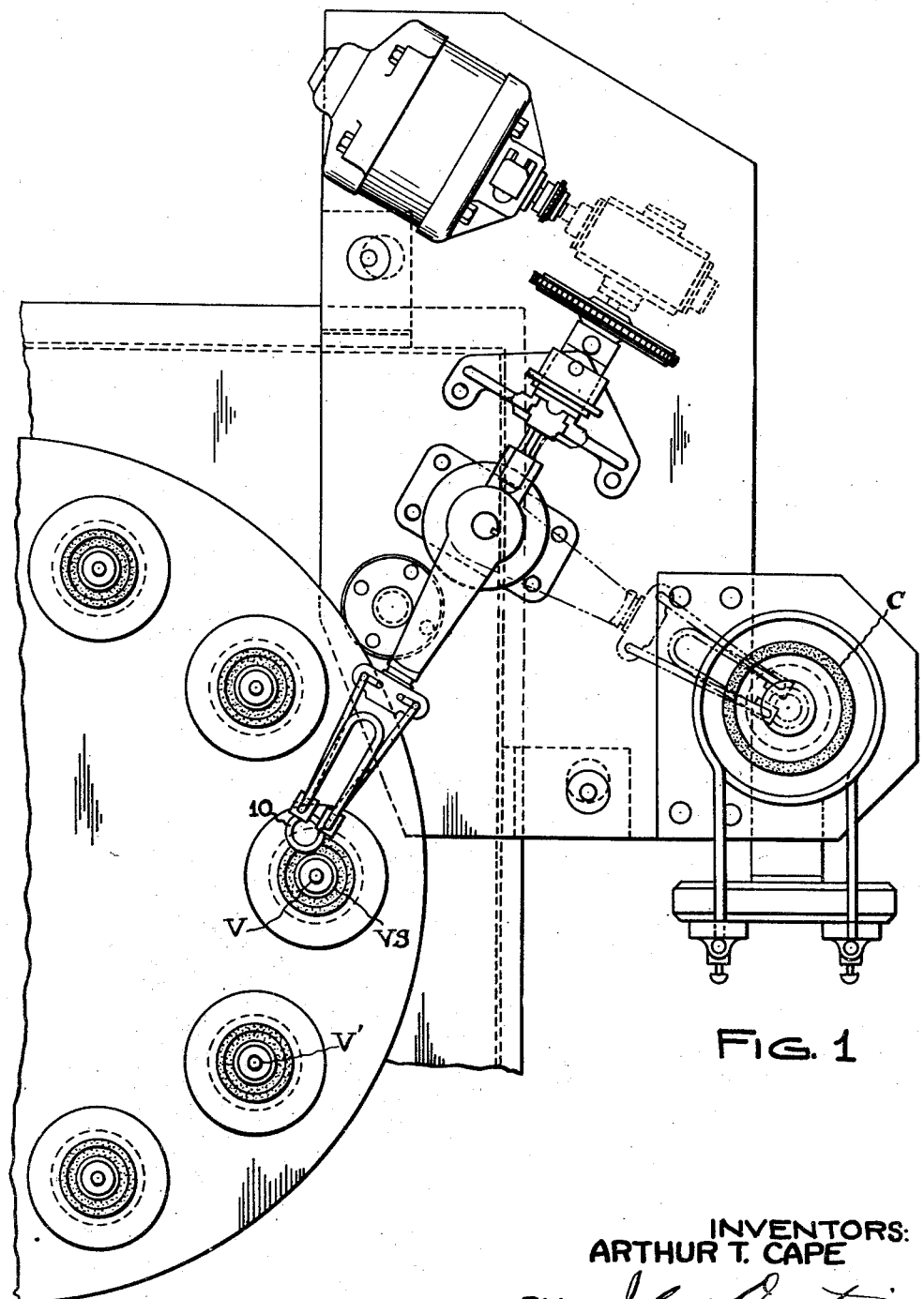

INVENTORS:
ARTHUR T. CAPE
BY
ATTORNEY.

May 17, 1955

A. T. CAPE 2,708,641

METHOD OF APPLYING METAL COATINGS TO VALVES

Filed July 19, 1952

2 Sheets-Sheet 2

INVENTORS:
ARTHUR T. CAPE

BY

ATTORNEY.

United States Patent Office 2,708,641
Patented May 17, 1955

2,708,641

METHOD OF APPLYING METAL COATINGS TO VALVES

Arthur T. Cape, Los Angeles, Calif., assignor to Coast Metals, Inc., Little Ferry, N. J., a corporation of Delaware Application July 19, 1952, Serial No. 299,881

2 Claims. (Cl. 117—50)

This invention relates generally to methods of applying metal coatings, but has reference more particularly to the application of layers or facings of protective heat and wear-resistant metal to the surfaces of valves, which, in use, are subjected to high temperatures and abrasive wear.

It has heretofore been common practice, in the application of such metal to the seat portions of poppet valves, for example, to rotate the valve at a uniform rate about a vertically-disposed axis, to preheat the area to be coated to a welding temperature by means of gas flames, and to then progressively deposit the molten protective metal at a uniform rate upon successive portions of said area while continuing the rotation of the valve, said protective metal being derived from the melting of welding rods. Such practice is disclosed, by way of example, in Wagner Patent No. 2,301,763.

The aforesaid method is disadvantageous in the following respects: (1) the application of protective metal by the gradual melting and depositing of molten drops upon successive portions of the annular preheated zone (see lines 55–68, first column, page 3 of the Wagner patent) is rather slow and difficult, particularly from the standpoint of depositing the metal in uniform, predetermined amounts, it being stated in the Wagner patent that the total time required for preheating and coating a valve head about two inches in diameter is approximately ninety seconds, (2) the thickness and uniformity of the coating is extremely difficult to control, so that a large portion of the aforesaid time is taken up by the necessity of spreading of the molten deposited metal by means of the gas torches subsequent to deposition of the metal (see lines 69–75, first column, page 3, and lines 7–12, second column, page 3, of the Wagner patent), and (3) the fact that preheating of the area to be coated to a mere "welding temperature" is not sufficient to enable production to be speeded up to any extent.

It has also been proposed, as in Longoria Patent No. 2,377,163 to support a valve with the peripheral tapered surface of the valve seat facing downwardly, upon a graphite electrode which is surrounded by a mold of refractory material, an annular mold cavity being provided between the upper surface of the mold and the aforesaid valve seat surface. An electrode bears on the valve head, and the peripheral portion of the valve head is preheated electrically by current supplied to the electrodes, thereby bringing the seating portion of the valve to a "softened condition, suitable for enabling it to form a bond with molten Stellite," at which time a metered amount of molten Stellite is delivered into the mold. In this way, a weld is produced on the valve seat, which is stated to be non-porous and homogeneous throughout.

The Longoria process, which has never been commercially, has a number of drawbacks and disadvantages including (1) the necessity of substantially filling the annular trough to insure that there will be sufficient coating metal to cover the valve seat (2) the danger of adherence of the molten metal to the electrodes and molds, (3) the necessity of virtually dismantling the apparatus to remove the coated valve, and (4) the failure to preheat the valve seating surface to any temperature which is within the purview of the present invention.

The present invention has as its primary object a method of applying protective metal coatings of the aforesaid character, whereby the articles can be coated at much greater speed than has heretofore been possible, and in a much more efficient manner, and whereby the thickness and uniformity of the coating are better controlled.

Other objects and advantages of the invention will be apparent during the course of the following description.

Figure 2:
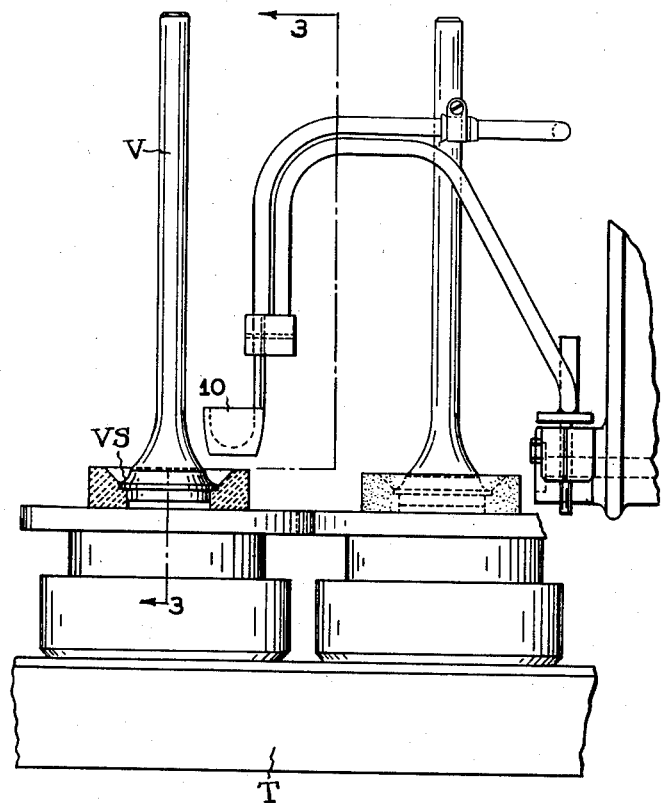
Figure 3:
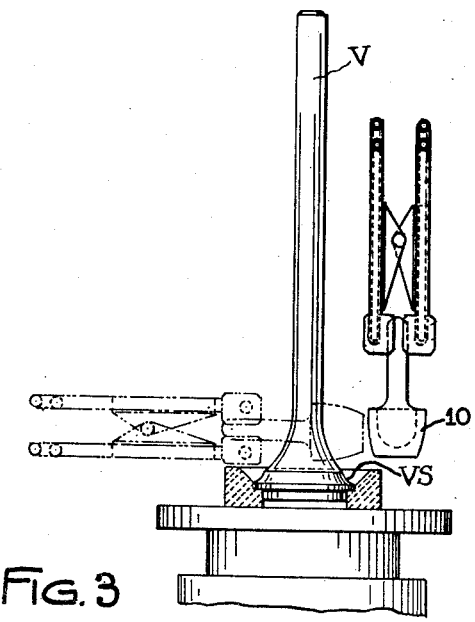

In the accompanying drawings, forming a part of this specification, and in which like numerals are employed to designate like parts throughout the same, Fig. 1 is a plan view illustrating one type of apparatus which may be used for practising the invention in accordance with the invention, and showing, in a somewhat diagrammatic manner, the transfer of the molten protective metal by means of a ladle from a crucible to a point from which the contents of the ladle may be poured onto the article which is to be coated with such protective metal, namely a valve seating surface;

Fig. 2 is a fragmentary side elevational view of a portion of the molten metal transfer apparatus, and Fig. 3 is a fragmentary cross-sectional view, taken on the line 3—3 of Fig. 2.

Referring more particularly to the drawings, the apparatus, the details of which form no part of the invention, and which may therefore assume various forms, is designed primarily to transfer molten protective metal from a supply of such metal contained in a crucible C (Fig. 1) to a position adjacent the valve V, by means of a ladle or dipper 10, and to cause the ladle of metal to be tilted from the vertical position shown in Figs. 1, 2 and 3 to the horizontal position shown in broken lines in Fig. 3, the metal being thus emptied from the ladle onto the valve seat VS. After the ladle has been thus emptied, the ladle is righted and is returned to the crucible for another supply of the molten protective metal for the coating of the valve seat of the next valve V' (see Fig. 1).

During the interval in which the ladle is returning to the crucible C for another supply of the molten protective metal, the turn-table T, upon which the valves are mounted, is automatically rotated through an arc equivalent to the distance between the valves, so that the next valve V' is brought to proper position for receiving the supply of molten metal intended therefor. The turn-table mechanism forms no part of the present invention, being similar to that described in the aforesaid Wagner patent.

The complete cycle of movement of the ladle, which includes the raising of the ladle in the crucible to remove the molten protective metal from the crucible, the swinging of the ladle through an arc necessary to bring it adjacent the valve seat which is to be coated, the tipping or tilting of the ladle for the purpose of pouring the molten metal onto the valve seat, the righting of the emptied ladle, the swinging of the emptied ladle back to the crucible, and the lowering of the ladle in the crucible to its initial metal-receiving position in the crucible, is effected automatically by means of mechanism which forms no part of the present invention.

It may be noted at this point that through means which form no part of the invention and are therefore not shown, the valve V is rotated about its own axis at a uniform speed as the protective metal is poured on the seat portion VS thereof.

The valves may be of various compositions, of which a few are indicated in the table below.

*Nominal compositions of wrought heat-resisting steels for exhaust valves in internal-combustion engines*

| C | Si | Cr | Ni | W | Mo | Other |
|---|---|---|---|---|---|---|
| 0.40 | 4.0 | 2.9 | ---- | ---- | ---- | ------ |
| 0.60 | ------ | 3.5 | ---- | 14.0 | ---- | ------ |
| 0.50 | 1.5 | 8.0 | ---- | ---- | 7.5 | ------ |
| 0.45 | 3.25 | 8.5 | ---- | ---- | ---- | ------ |
| 0.50 | 0.2 | 11.0 | 1.5 | ---- | ---- | 1.8 Al |
| 1.10 | 0.50 | 13.0 | ---- | ---- | ---- | ------ |
| 1.35 | 0.65 | 13.3 | ---- | ---- | 0.7 | 2.5 Co |
| 1.05 | 1.90 | 13.5 | 0.9 | 3.5 | 0.6 | ------ |
| 0.80 | 2.0 | 19.5 | 1.50 | ---- | ---- | ------ |
| 0.55 | 0.5 | 3.5 | 12.0 | ---- | ---- | 5.0 Mn |
| 1.10 | 2.50 | 15.5 | 14.0 | ---- | ---- | ------ |
| 0.45 | 0.55 | 14.0 | 14.0 | 2.4 | 0.35 | ------ |
| 0.45 | 3.00 | 14.0 | 14.0 | 2.4 | 0.5 | ------ |
| 0.50 | 1.25 | 14.0 | 86.0 | 3.5 | ---- | ------ |
| 0.38 | 2.9 | 19.0 | 8.0 | ---- | ---- | ------ |
| 0.50 | 1.0 | 20.0 | 32.0 | ---- | ---- | ------ |
| 0.25 | 0.85 | 21.5 | 11.5 | ---- | ---- | ------ |
| 0.25 | 2.80 | 21.5 | 11.5 | ---- | ---- | ------ |
| 0.45 | 0.55 | 25.0 | 14.0 | ---- | 2.5 | ------ |
| 0.30 | 2.50 | 12.8 | 7.4 | ---- | ---- | ------ |
| 0.45 | 0.45 | 23.8 | 4.8 | ---- | 2.75 | ------ |

The foregoing compositions have melting points ranging from about 2600° F. to about 2800° F.

The protective metals employed for coating the surfaces VS of the valves are preferably selected from hard facing high temperature metals, of which those described in my U. S. Patents Nos. 2,396,552; 2,458,502 and 2,481,976, are representative. These have melting points in the range 2400° F.–2500° F. Another metal which may be used for this purpose is a Stellite composition containing 64% cobalt, 30% chromium, 4½% tungsten, with remainder iron, silicon and manganese, and having a melting point of about 2400° F. Before pouring the molten protective metal onto the seat portion VS of the valve, the surface VS of the valve is preheated to a temperature at which actual melting of said surface occurs. This preheating is usually accomplished by playing a flame on the surface VS as it rotates, but may be accomplished by other means. This actual melting of said surface occurs at a temperature very close to or approximating the melting temperature of the valve material. The depth to which the surface VS is molten need be only .001". In practice, however, the actual temperature to which the surface VS is heated to produce this molten condition will vary somewhat from the actual melting point depending upon whether the melting point of the protective metal is higher or lower than the melting point of the valve material. If the melting point of the protective metal is higher than the melting point of the valve material, the heat of the protective metal will be imparted to the surface VS and increase the temperature of the surface VS, so that the surface VS need not be preheated to its melting point, but may be preheated to a temperature which may be as much as 50 Fahrenheit degrees lower than the melting point of the valve material. If the melting point of the protective metal is lower than the melting point of the valve material, which is more often the case, the protective metal will extract heat from the surface VS and therefore lower the temperature of the surface VS, so that the surface VS should be preheated to a temperature above its melting point, which temperature may be as much as 100 Fahrenheit degrees higher than the melting point of the valve material. The surface VS, for the purposes of the present invention, should therefore be heated to a temperature within the range of from 50 Fahrenheit degrees below the melting point of the valve material to 100 Fahrenheit degrees above the melting point of the valve material.

Actual fusion of the surface VS is extremely critical, and when the protective metal is poured onto the surface VS while the latter is in said fused state, the protective metal instantaneously covers the aforesaid seat portion of the valve to the desired depth and is substantially uniformly distributed over said seat portion of the valve. If the said surface is not in a fused state, bonding may take place, but uniform distribution of the coating metal will not be accomplished.

The phenomenon described above is, in effect, due to a marked and dramatic lowering of the surface tension of the surface VS which occurs in the temperature range stated. The surface VS, so to speak, becomes "wetted," and it has been determined through experimentation that the protective metal when poured onto the surface thus wetted, spreads uniformly about the annular surface VS, even if the valve is not rotated about its own axis. In production, however, the valve is rotated about its own axis, as described, primarily to enable the valve seat to be preheated uniformly and quickly.

The amount of molten protective metal which is poured onto the valve surface at a single point from the ladle is sufficient to provide substantially the entire facing, so that the facing may be said to be poured at one time.

The flowing of the protective metal around the valve seating surface occurs virtually instantaneously, that is to say within one second or less, as compared with ninety seconds in the Wagner process. This instantaneous flow or distribution over the surface VS is, in fact, so rapid that except for the fact that the metal would otherwise run off the surface VS due to the action of gravity, it would not be necessary to use the annular refractory support for the valve during the pouring on of the protective metal. The refractory support for the valve, in other words, does not function like a mold (to confine the overlay metal), but serves only to prevent the applied molten metal from running off during the fraction of a second that it takes for the metal to race around the valve seat, to contain or retain the heat on the surface to be coated, and to prevent burning of the thin edge of the valve.

It must be emphasized that the temperatures to which the seat VS is heated in the present case, are extremely critical, and that the use of terms such as "welding temperature" in the Wagner patent and "softened condition" in the Longoria patent do not necessarily imply a heating to any temperature within such critical range, since welding as well as softening occurs at temperatures far below such critical range.

The instantaneous and uniform distribution of the protective metal, coupled with the fact that only an amount of molten facing metal sufficient to provide substantially the entire facing is deposited upon the valve surface, results in a hard facing whose uniformity and thickness are positively controlled, and which does not require expensive and time-consuming efforts to remove excess facing metal by grinding and other methods.

The method, as herein described, obviates the use of welding rods, which, in the case of protective metals, involves a costly manufacturing process of melting, casting and grinding. Moreover, the application of the welding rod must be accomplished through successive applications of molten drops of metal, melted from the end of the rod, which operation requires manual control, and necessarily, the application takes place over a period of several seconds. All of this is in contrast to the instantaneous application of the metal by the method as herein described.

It is to be understood that various changes may be made in the method herein specifically described without departing from the spirit of the invention or the scope of the appended claims.

Having thus described my invention, I claim:

1. The method of providing a wearing surface of valves and similar articles having a melting temperature within the range 2600° F.–2800° F., with an annular welded-on facing of a protective metal, which comprises supporting a poppet-valve along an annular zone at the margin of the valve head, said valve head having an annular seating surface facing in an upward direction and supported at an acute angle with the horizontal, rotating said surface at a uniform speed about its own axis, locally heating the surface until the surface is substantially molten, rapidly and uniformly pouring a measured quantity of molten surfacing metal from one point onto the rotating surface, said substantially molten surface and the temperature of said molten material causing instantaneous coating of the molten surface with the facing material.

2. The method of providing a wearing surface of valves or similar articles having a melting temperature within the range 2600° F.–2800° F., with an annular welded-on facing of a protective metal, which comprises supporting a poppet-valve along an annular zone at the margin of the valve head, said valve head having an annular seating surface facing in an upward direction and supported at an acute angle with the horizontal, rotating said surface at a uniform speed about its own axis, locally heating the upwardly facing surface to a point below but within 50° F. of the melting point to 100° F. above the melting point of said surface, rapidly and uniformly pouring a measured quantity of molten surfacing metal from one point onto the rotating surface, the temperature of the molten surfacing material being high enough to insure that the surface is at least molten to cause instantaneous coating of the molten surface with the facing material.

References Cited in the file of this patent

UNITED STATES PATENTS

| | | |
|---|---|---|
| 2,273,250 | Charlton | Feb. 17, 1942 |
| 2,301,763 | Wagner | Nov. 10, 1942 |
| 2,377,163 | Longoria | May 29, 1945 |